(12) United States Patent
Margulis

(10) Patent No.: US 7,263,534 B1
(45) Date of Patent: Aug. 28, 2007

(54) AUTOMATIC SET UP FOR EDITING A WEB SITE

(75) Inventor: Joshua K. Margulis, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 554 days.

(21) Appl. No.: 10/689,870

(22) Filed: Oct. 21, 2003

(51) Int. Cl.
G06F 17/30 (2006.01)

(52) U.S. Cl. .................. 707/104.1; 707/1

(58) Field of Classification Search .......... 707/1–10, 707/100–104.1, 200–206; 709/202, 224; 717/173; 705/51
See application file for complete search history.

(56) References Cited

U.S. PATENT DOCUMENTS

| | | | | |
|---|---|---|---|---|
| 6,078,929 A * | 6/2000 | Rao | ............ | 707/200 |
| 6,944,658 B1 * | 9/2005 | Schneider | ............ | 709/224 |
| 6,959,288 B1 * | 10/2005 | Medina et al. | ............ | 705/51 |
| 7,032,000 B2 * | 4/2006 | Tripp | ............ | 709/202 |
| 7,086,050 B2 * | 8/2006 | Barton et al. | ............ | 717/173 |

OTHER PUBLICATIONS

U.S. Appl. No. 10/690,980, K. P. Sundermeyer et al.
U.S. Appl. No. 10/690,214, M. J. Sundermeyer et al.
U.S. Appl. No. 10/689,860, D. P. Brown.

* cited by examiner

Primary Examiner—Yicun Wu
(74) Attorney, Agent, or Firm—Fulbright & Jaworski LLP

(57) ABSTRACT

A system and method is disclosed for automatically setting up a Web site for editing. One embodiment of such a system and method may comprise selecting a common file transfer path from a plurality of common file transfer paths, generating a test file, writing the test file to a storing computer through the file transfer server using the selected common file transfer path, requesting the test file from a Web server hosting the Web site, determining the common file transfer path is valid when the test file is received from the Web server responsive to the requesting, and selecting another common file transfer path from the plurality of common file transfer paths when the test file is not received from the Web server, wherein the method is repeated from the generating step using another common file transfer path.

14 Claims, 2 Drawing Sheets

AUTOMATIC SET UP FOR EDITING A WEB SITE

CROSS-REFERENCE TO RELATED APPLICATIONS

The present application is related to concurrently-filed, co-pending, and commonly assigned U.S. patent application Ser. No. 10/690,980, entitled, "CONTENT-RESTRICTED EDITING," U.S. patent application Ser. No. 10/690,214, entitled, "WEB SITE MANAGEMENT LIFECYCLE," and U.S. patent application Ser. No. 10/689,860, entitled, "CROSS-PROTOCOL URL MAPPING," the disclosures of which are hereby incorporated herein by reference.

TECHNICAL FIELD

The present invention relates, in general, to Web development systems, and, more specifically, to an automatic set up for editing a Web site.

BACKGROUND OF THE INVENTION

Companies typically use the World Wide Web to disseminate information both internally, to employees and contractors, and externally, to customers and business partners. This information is usually generated by subject matter experts (SMEs), who are typically people with expertise in the information domain, but who are not usually technically skilled. In order to publish this information to the Web, or edit the existing information already on a company Internet or Intranet Web site, SMEs typically work with technically skilled Web developers, who generally combine Web coding or computer programming skills and graphics design skills. Skilled Web developers are an expensive resource. Moreover, Web developers may divide the coding and graphics arts expertise into multiple people.

Web sites generally comprise a Web server, that serves the visual and data content to the user's browser many times in a format, such as hypertext markup language (HTML), and a file transfer server, that provides read and write-access to the files that make up the visual and data content of the Web sites. While Web servers and file transfer servers are conceptualized as separate and independent machines, Web servers and file transfer servers are typically only software applications, often times running on the same computer. The underlying Web files are usually stored in memory or storage accessible by the computer, and the Web server and file transfer server applications interact with those files in different ways. Web servers typically allow read-only access to the Web files, compared to the read/write-access allowed by the file transfer servers. Because the file transfer server allows read/write-access to Web files, general users are not typically given access to the file transfer server because changing files through the file transfer server will change how the Web pages are served through the Web server to the accessing browsers. Instead, file transfer server access is generally limited to Web developers or those who have some authority over the Web content. File transfer servers typically run a specific transfer protocol, such as file transfer protocol (FTP), secure FTP (SFTP), or the like. Additionally, the file transfer server may be set up on a local area network (LAN), or the like. For purposes of this application, file transfer servers will be referred to as FTP servers, even though it is not limited to running only FTP protocol.

Web development environments and development tools exist to assist the developers both retrieve and edit the underlying files that make up the Web pages. In order to access the Web files on the storing computer through the FTP server, a Web designer or developer is generally prompted by the server access application to provide the FTP host name, the FTP login, the FTP password, and the FTP path. While the FTP host, login, and password are usually the pieces of information that will get the user onto the FTP server, without the FTP path, a user will not likely find the location through which the FTP server accesses the underlying Web files on the computer. For most experienced designers or developers all of this information is relatively easy to know and/or obtain. A novice or non-technical user may know the FTP host name, login, and password, but would generally not know the FTP path; and, without the path, the FTP server will generally not allow access to the appropriate file locations. One solution for such novice or non-technical persons is to track down an information technology (IT) professional or other computer professional to obtain that information. Another solution is to simply hire an experienced designer to make the desired changes to the Web site. However, each of these current solutions comes at a cost of time and money; sometimes just to make a few minor changes or revisions to the Web site.

BRIEF SUMMARY OF THE INVENTION

One representative embodiment of the present invention is related to a system and method for automatically setting up a Web site for editing by a Web development environment. The development environment asks the user to supply the file transfer server host name, login, and password, in order to be able to access and log into the file transfer server. The development environment attempts to discover the Web server root directory name or path by heuristically attempting to write test or sample files to the file transfer server using a list or database of commonly used file transfer path or root directory names. Each time a sample file is written to a specific root directory, the development environment make a hypertext transfer protocol (HTTP) request to the Web server hosting the target Web site, to view the sample file. If the file transfer path or root directory name used was correct the Web server will return a read-only copy the correct file to the browser at the computer where the development environment is being run. However, if the path or directory name used was not correct, either an error message or a different file will be returned to the browser. The development environment recognizes this incorrect file or error message and uses the next available file transfer path or root directory name on the list. Each available common path or directory name is attempted until either the correct path or root directory is found, or the web development environment runs out of common names. When no more names are available, the user interface of the development environment resorts to requesting the correct path or root directory name from the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Web site maintenance is typically a time consuming and costly process. Even where small changes to the content of Web pages are made, development professionals typically are required to implement the changes due to their specific knowledge of the Web server/FTP server systems and, in the interest of preserving the format and design of the Web sites that they have spent considerable effort designing and implementing. A new technology developed by MACROMEDIA, INC., and described in concurrently-filed, commonly-owned patent application, entitled, "WEB SITE MANAGEMENT LIFECYCLE," allows non-technical users to browse to a particular Web site or Web page in which the content is to be edited/deleted/added, click on a button to edit that Web page, after which the system seamlessly presents the editable file in the same visual window to the user who may then edit the Web file in the same screen, and then click on a publish button, after which the system seamlessly stores the underlying, now-edited, Web file back into the storing computer's memory or accessible storage media through the FTP server along with all of the necessary dependent files in the appropriate places on the storing computer system. This process generally occurs without the necessity that the user know the correct FTP server file transfer root directory name or the relationship between the Web server and the FTP server file systems. One problem in implementing this Web site management lifecycle is the discovery of the FTP server root directory name that points to the location of the Web files on the storing computer's memory.

Figure 1:
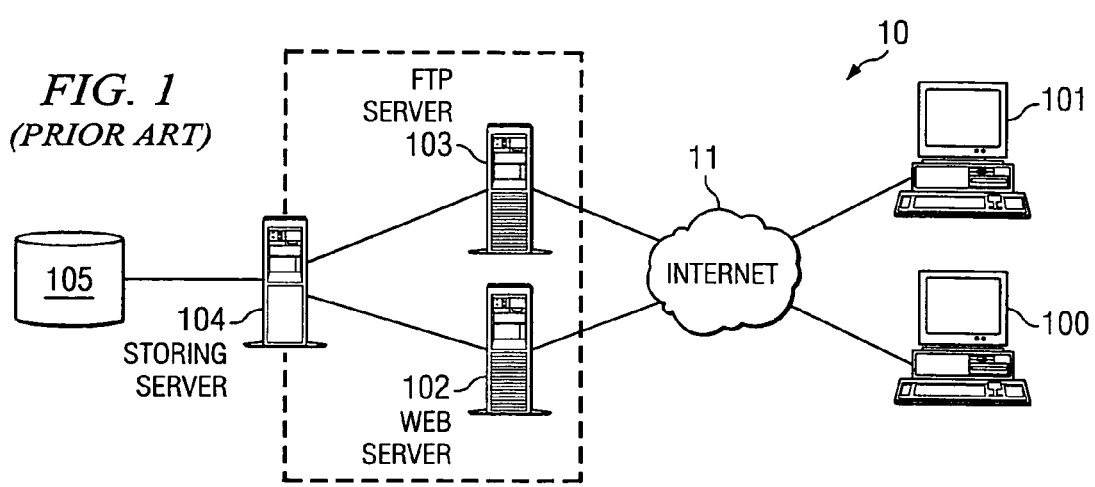
FIG. 1 is a block diagram illustrating a typical system for viewing Web sites and Web pages.

FIG. 1 is a block diagram illustrating typical system 10 for viewing Web sites and Web pages. A user at computer 100 and/or 101 may view a Web site hosted by Web server 102 by accessing Web server 102 over Internet 11. The browser at computer 100 requests the HTML or similar type Web files from Web server 102 using HTTP or other such Web transfer protocol. Web server 102 then transmits the HTML along with copies of any necessary files from their storage locations on storing computer 104 or storage device 105 to the browser for rendering the Web page to the user. Web developers may access the actual Web files to change them through FTP server 103. FTP server 103 would generally access the Web files stored at storing computer 104 and/or storage device 105.

Figure 2:
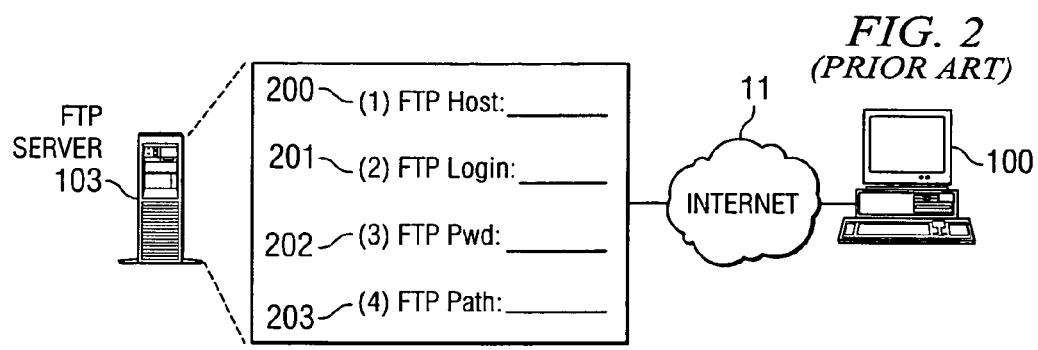
FIG. 2 is a block diagram detailing a connection route to an FTP server.

FIG. 2 is a block diagram detailing a connection route to FTP server 103. If the user at computer 100 desires to edit the Web page, he or she must download the underlying Web files through FTP server 103. However, in order to access FTP server 103, the developer, at computer 100, first enters information representing FTP host 200, login 201, password 202, and FTP path 203 for the Web site. Without any one of FTP host 200, login 201, and password 202, the developer would generally be denied access to FTP server 103. Furthermore, without FTP path 203, the developer would be practically unable to access any of the pertinent underlying Web files, regardless of whether the other information is available.

Figure 3:
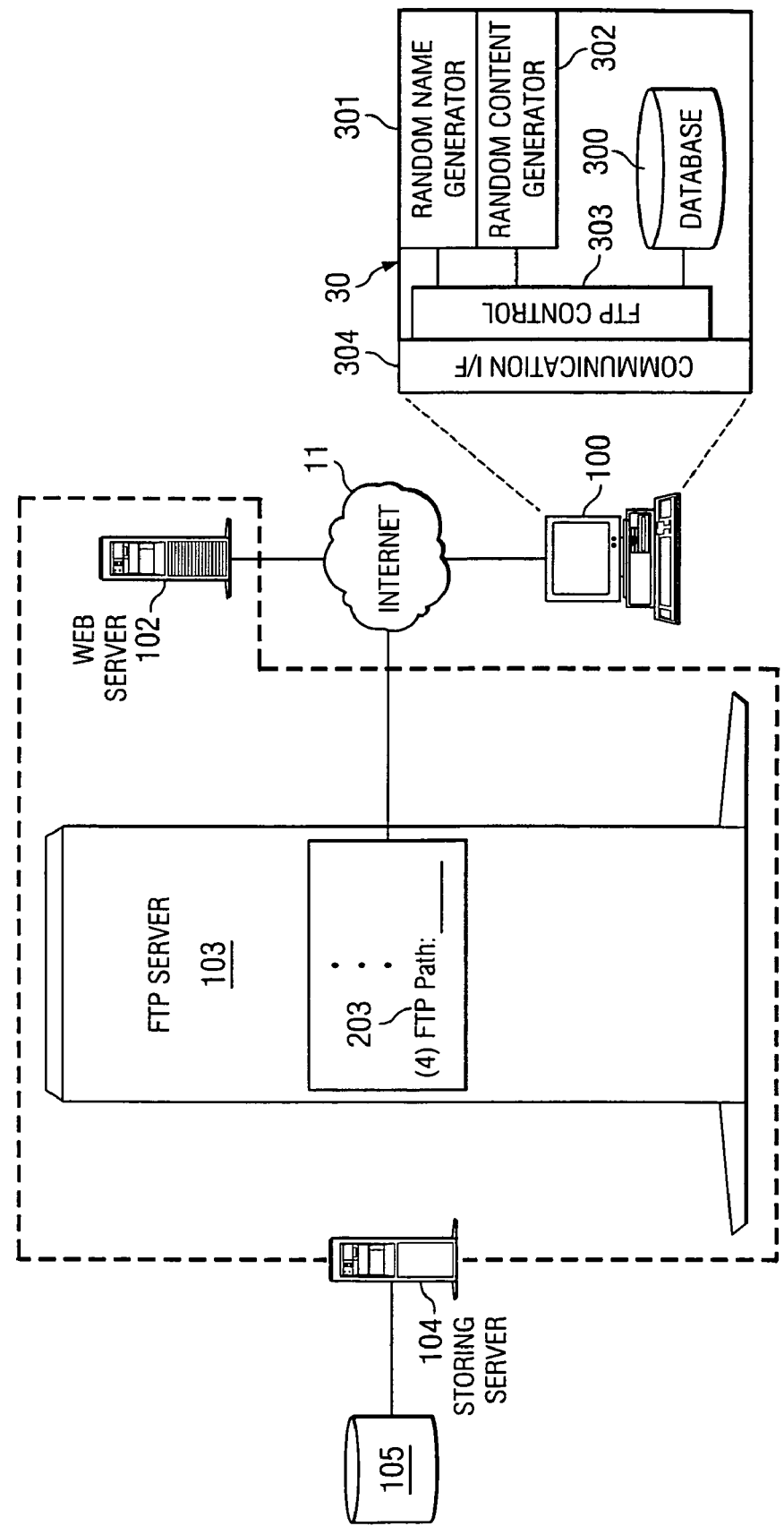
FIG. 3 is a block diagram illustrating one embodiment of the present invention operating on a computer.

FIG. 3 is a block diagram illustrating one embodiment of the present invention operating on computer 100. Development environment 30 resides on a memory of computer 100. A user, who may desire to edit a Web page serviced by FTP server 103, would start development environment 30 and indicate the preferences for the particular Web site or Web page to be edited. Development environment 30 requests the user to provide the FTP host 200, login 201, and password 202 information at initiation. Development environment 30 will then attempt to automatically discover the FTP path or Web server root directory without further intervention from the user.

Development environment 30 maintains database 300 in which a list of standard or common FTP path names is stored. Development environment 30 generates a test file using random name generator 301 and random content generator 302. FTP controller 303 then assembles the randomly created file and file name, and uses the first standard FTP path name from database 300 to attempt to write the test file to storing computer 104 or storage device 105 through FTP server 103 using communication interface 304. FTP controller 303 uses the other user-provided information along with standard FTP path from database 300 to gain access to FTP server 103 and write the random file. FTP controller 303 then requests Web server 102 to serve the test file back from storing computer 104 or storage device 105 to a browser at computer 100. If an error message is returned, FTP controller 303 determines that the first standard FTP path or root directory was incorrect. FTP controller 303 then accesses database 300 again to obtain the next standard or common FTP path or root directory name in the list and repeats the process. If, however, the test file is returned, FTP controller 303 verifies the content of that file, which was originally produced by random content generator 302. If the content matches, FTP controller determines that the FTP path or root directory name that was used was correct. FTP controller 303 may verify the test file by setting a validation flag or other such indicator. It should be noted that random file names and content may be used by FTP controller 303 in order to ensure that file names and content are not overlapped, in case a file of the same name actually exists on the computer storing the Web files already.

Figure 4:
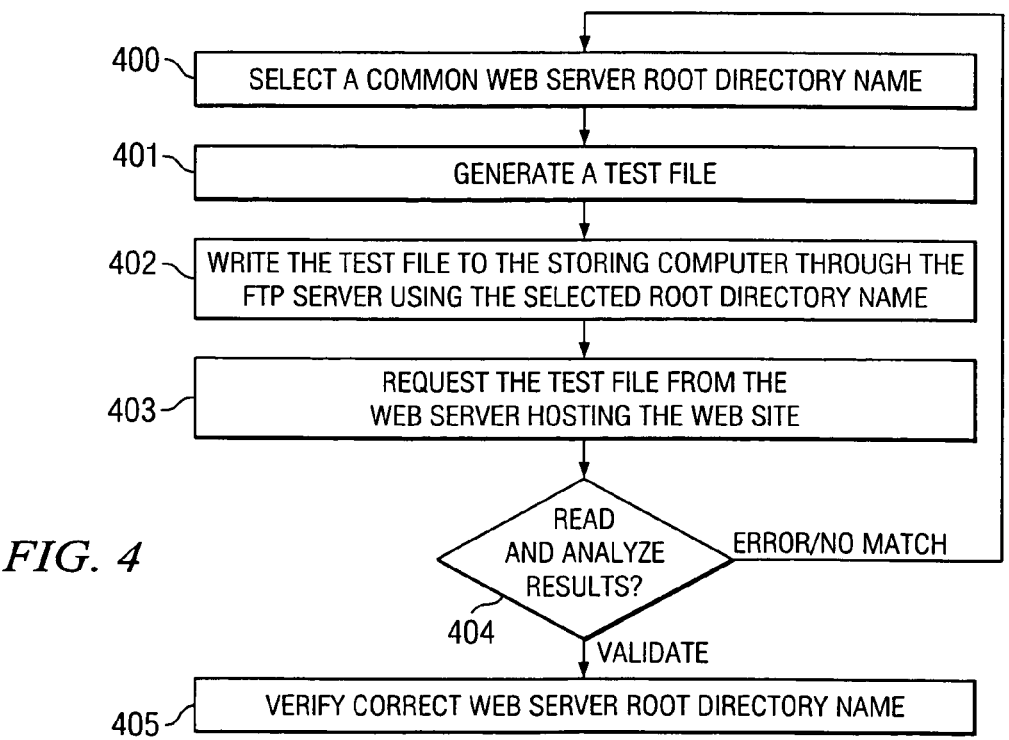
FIG. 4 is a flowchart illustrating steps taken in implementing one embodiment of the present invention.

FIG. 4 is a flowchart illustrating steps taken in implementing one embodiment of the present invention. In step 400, the FTP path or root directory name for an underlying Web site is selected based on a common FTP server path or root directory name. In step 401, a test file is generated. In selected embodiments, the test file may be generated using a random file name and content. The test file is pushed or written to the storing computer memory/storage through the FTP server in step 402 using the selected FTP server path or root directory name. Using the URL of the target Web site, an HTTP request is made to the Web server to serve the test file back to the developers browser in step 403. In step 404, the browser reads the result of the request from the Web server and determines whether the results returned from the Web server are error information, in which case the selected Web server path or root directory name is determined to be incorrect, or whether the results returned are the actual test file. If error information is received, then the process starts over at step 400 to select a new FTP path or root directory name. If, however, the correct test file is returned from the Web server responsive to the HTTP request, the FTP server path or root directory name is verified as correct in step 405.

It should be noted that in selected embodiments of the present invention, if the system unsuccessfully attempts to find the FTP path after going through each of the standard or common addresses or links, the user may be requested to provide such FTP path. However, selected embodiments of the present invention will only generally ask the user for the path name or root directory name after multiple such common or standard names are automatically attempted.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for automatically setting up a Web site for editing comprising:
   selecting a common file transfer path from a plurality of common file transfer paths;
   generating a test file;
   writing said test file through a file transfer server using said selected common file transfer path;
   requesting said test file from a Web server hosting said Web site;
   determining said common file transfer path is valid when said test file is received from said Web server responsive to said requesting; and
   selecting another common file transfer path from said plurality of common file transfer paths when said test file is not received from said Web server, wherein said method is repeated from said generating step using said another common file transfer path.

2. The method of claim 1 further comprising:
   receiving file transfer server login information from a user; and
   using said login information in said writing said test file step.

3. The method of claim 1 wherein said generating said test file comprises:
   generating a randomized file name; and
   generating randomized content for said test file.

4. The method of claim 3 further comprising:
   comparing said test file received from said Web server responsive to said requesting, to said randomized name and said randomized content; and
   validating said test file when said returned test file matches said randomized name and said randomized content.

5. The method of claim 1 further comprising:
   comparing said test file received from said Web server responsive to said requesting, to said written test file; and
   validating said test file when said received test file matches said written test file.

6. The method of claim 1 further comprising:
   requesting said file transfer path from said user when each of said plurality of common file transfer paths has been attempted.

7. A computer program product having a computer readable medium with computer program logic recorded thereon for automatically setting up a Web site for editing, said computer program product comprising:
   code for selecting a root directory name from of a plurality of standard Web server root directory names;
   code for generating a sample file;
   code for storing said sample file to said root directory name of a storing computer through a file transfer server;
   code for requesting retrieval of said sample file from a Web server hosting said Web site;
   code for determining said root directory name is authentic when said sample file is retrieved from said Web server; and
   code for selecting a next directory name from said plurality of standard Web server root directory names when said sample file is not retrieved, wherein said code is repeated from said code for generating using said next directory name.

8. The computer program product of claim 7 further comprising:
   code for obtaining file transfer server login information from a user; and
   code for logging onto said file transfer server using said login information.

9. The computer program product of claim 7 wherein said generating said sample file comprises:
   code for creating a random file name for said sample file; and
   code for creating random data for said sample file.

10. The computer program product of claim 9 further comprising:
    code for comparing said retrieved sample file to said random name and said random content; and
    code for validating said directory name when said retrieved sample file matches said random name and said random content.

11. The computer program product of claim 7 further comprising:
    code for comparing said retrieved sample file to said stored sample file; and
    code for validating said retrieved sample file when said retrieved sample file matches said stored.

12. The computer program product of claim 7 further comprising:
    code for requesting said Web server root directory name from said user when each of said plurality of standard Web server root directory names has been attempted.

13. A method for automatically setting up a Web site for editing comprising:
- selecting a common file transfer path from a plurality of common file transfer paths;
- generating a test file, wherein said generating comprises:
  - generating a randomized file name; and
  - generating randomized content for said test file;
- writing said test file through a file transfer server using said selected common file transfer path;
- requesting said test file from a Web server hosting said Web site;
- comparing said test file received from said Web server responsive to said requesting, to said randomized name and said randomized content;
- validating said test file when said returned test file matches said randomized name and said randomized content;
- determining said common file transfer path is valid when said test file is received from said Web server responsive to said requesting; and
- selecting another common file transfer path from said plurality of common file transfer paths when said test file is not received from said Web server, wherein said method is repeated from said generating step using said another common file transfer path.

14. A computer program product having a computer readable medium with computer program logic recorded thereon for automatically setting up a Web site for editing, said computer program product comprising:
- code for selecting a root directory name from of a plurality of standard Web server root directory names;
- code for generating a sample file, wherein said generating comprises:
  - code for creating a random file name for said sample file; and
  - code for creating random data for said sample file;
- code for storing said sample file to said root directory name of a storing computer through a file transfer server;
- code for requesting retrieval of said sample file from a Web server hosting said Web site;
- code for comparing said retrieved sample file to said random name and said random content;
- code for validating said directory name when said retrieved sample file matches said random name and said random content;
- code for determining said root directory name is authentic when said sample file is retrieved from said Web server; and
- code for selecting a next directory name from said plurality of standard Web server root directory names when said sample file is not retrieved, wherein said code is repeated from said code for generating using said next directory name.

* * * * *